United States Patent
Klesyk

(10) Patent No.: US 9,440,538 B2
(45) Date of Patent: Sep. 13, 2016

(54) HOUSEKEEPING CIRCUIT HAVING TRICKLE CHARGE CAPABILITIES

(75) Inventor: Krzysztof Klesyk, Novi, MI (US)

(73) Assignee: Lear Corporation, Southfield, MI (US)

( * ) Notice: Subject to any disclaimer, the term of this patent is extended or adjusted under 35 U.S.C. 154(b) by 901 days.

(21) Appl. No.: 13/294,423

(22) Filed: Nov. 11, 2011

(65) Prior Publication Data

US 2013/0119755 A1 May 16, 2013

(51) Int. Cl.
- *B60L 1/00* (2006.01)
- *B60L 3/00* (2006.01)
- *H02G 3/00* (2006.01)
- *B60L 11/18* (2006.01)

(52) U.S. Cl.
CPC .............. *B60L 1/00* (2013.01); *B60L 11/1868* (2013.01); *Y02T 10/7005* (2013.01); *Y02T 10/7066* (2013.01)

(58) Field of Classification Search
CPC .. B60L 1/00; B60L 11/1868; Y02T 10/1868; Y02T 10/7005
USPC ......................................................... 307/9.1
See application file for complete search history.

(56) References Cited

U.S. PATENT DOCUMENTS

| | | | |
|---|---|---|---|
| 4,439,819 A * | 3/1984 | Regan | 363/17 |
| 4,662,232 A | 5/1987 | Gonsalves et al. | |
| 4,897,662 A | 1/1990 | Lee et al. | |
| 5,012,113 A | 4/1991 | Valentine et al. | |
| 5,151,645 A * | 9/1992 | Murata | 320/163 |
| 5,617,466 A | 4/1997 | Walance | |
| 5,978,236 A * | 11/1999 | Faberman et al. | 363/37 |
| 6,393,571 B1 | 5/2002 | Huckfeldt et al. | |
| 6,459,247 B1 | 10/2002 | Benes | |
| 6,662,123 B2 | 12/2003 | Maeckel et al. | |
| 6,724,593 B1 | 4/2004 | Smith | |
| 6,905,362 B2 | 6/2005 | Williams | |
| 6,963,186 B2 | 11/2005 | Hobbs | |
| 7,253,584 B2 | 8/2007 | Souther et al. | |
| 7,279,805 B2 | 10/2007 | Senda et al. | |
| 7,411,371 B2 | 8/2008 | Hobbs | |
| 7,506,182 B2 | 3/2009 | Taniguchi et al. | |
| 7,579,807 B2 | 8/2009 | Funabashi et al. | |
| 7,791,217 B2 | 9/2010 | Kamaga | |
| 7,878,866 B1 | 2/2011 | Kwasny et al. | |
| 8,109,139 B2 | 2/2012 | Wagner et al. | |

(Continued)

FOREIGN PATENT DOCUMENTS

| | | | |
|---|---|---|---|
| CN | 1351775 A | 5/2002 | |
| CN | 1870374 A | 11/2006 | |

(Continued)

OTHER PUBLICATIONS

Office Action for U.S. Appl. No. 13/192,559 dated Dec. 24, 2014.

(Continued)

*Primary Examiner* — Rexford Barnie
*Assistant Examiner* — Toan Vu
(74) *Attorney, Agent, or Firm* — Brooks Kushman P.C.

(57) ABSTRACT

A housekeeping circuit configured to facilitate powering multiple loads is contemplated. The housekeeping circuit may include a transformer to regulate voltage output for using in powering the loads. A trickle circuit may be included to facilitate setting a minimum loading on the transformer. The minimum loading may be beneficial in insuring proper regulation of the transformer.

16 Claims, 3 Drawing Sheets

(56) References Cited

U.S. PATENT DOCUMENTS

| | | |
|---|---|---|
| 8,244,422 B2 | 8/2012 | Fujitake |
| 8,450,980 B2 | 5/2013 | Kumar et al. |
| 8,749,198 B2 | 6/2014 | Klesyk |
| 8,791,666 B2 | 7/2014 | Yokoyama et al. |
| 8,945,735 B2 | 2/2015 | Kim |
| 2002/0041174 A1 | 4/2002 | Purkey |
| 2002/0081486 A1 | 6/2002 | Williams |
| 2004/0125626 A1 | 7/2004 | Kanouda et al. |
| 2004/0130288 A1 | 7/2004 | Souther et al. |
| 2004/0169489 A1 | 9/2004 | Hobbs |
| 2005/0141163 A1 | 6/2005 | Franke et al. |
| 2005/0212438 A1 | 9/2005 | Senda et al. |
| 2006/0028178 A1 | 2/2006 | Hobbs |
| 2006/0267410 A1 | 11/2006 | Kanouda et al. |
| 2007/0132457 A1 | 6/2007 | Okamoto et al. |
| 2008/0136371 A1 | 6/2008 | Sutardja |
| 2008/0205086 A1 | 8/2008 | Darroman et al. |
| 2009/0026837 A1* | 1/2009 | Lee .............................. 307/10.1 |
| 2009/0033253 A1 | 2/2009 | Nagashima et al. |
| 2009/0034308 A1 | 2/2009 | Welchko et al. |
| 2009/0160255 A1* | 6/2009 | Grady ............................. 307/66 |
| 2009/0224724 A1 | 9/2009 | Ma et al. |
| 2009/0246596 A1 | 10/2009 | Sridhar et al. |
| 2009/0322257 A1* | 12/2009 | Kim et al. .................... 315/308 |
| 2010/0017249 A1 | 1/2010 | Fincham et al. |
| 2010/0078997 A1 | 4/2010 | Chen et al. |
| 2010/0097031 A1 | 4/2010 | King et al. |
| 2010/0141203 A1 | 6/2010 | Graziano et al. |
| 2010/0165668 A1 | 7/2010 | Lin |
| 2010/0215994 A1 | 8/2010 | Kim |
| 2010/0225274 A1 | 9/2010 | Fujitake |
| 2010/0228413 A1 | 9/2010 | Fujitake |
| 2010/0292890 A1 | 11/2010 | Morris |
| 2010/0295507 A1 | 11/2010 | Ishii et al. |
| 2010/0299008 A1 | 11/2010 | Mitsutani |
| 2011/0057604 A1 | 3/2011 | Capella |
| 2011/0095728 A1 | 4/2011 | Chen et al. |
| 2011/0163722 A1 | 7/2011 | Gale et al. |
| 2011/0166725 A1 | 7/2011 | Booth et al. |
| 2011/0199048 A1 | 8/2011 | Yokoyama et al. |
| 2011/0202192 A1 | 8/2011 | Kempton |
| 2011/0204845 A1 | 8/2011 | Paparo et al. |
| 2011/0210698 A1 | 9/2011 | Sakai |
| 2012/0049796 A1 | 3/2012 | Fukatsu |
| 2012/0268065 A1 | 10/2012 | Klesyk |
| 2013/0026827 A1 | 1/2013 | Hampo et al. |
| 2013/0120889 A1 | 5/2013 | Klesyk |

FOREIGN PATENT DOCUMENTS

| | | |
|---|---|---|
| CN | 201122850 Y | 9/2008 |
| CN | 201345044 Y | 11/2009 |
| CN | 101777779 A | 7/2010 |
| CN | 201528214 A | 7/2010 |
| CN | 101801711 A | 8/2010 |
| CN | 101814725 A | 8/2010 |
| CN | 102005789 | 4/2011 |
| CN | 102037625 | 4/2011 |
| CN | 102085861 | 6/2011 |
| CN | 102104280 | 6/2011 |
| CN | 102195224 A | 9/2011 |
| DE | 202006020319 U1 | 5/2008 |
| DE | 202008005682 U1 | 2/2009 |
| DE | 102008047502 A1 | 4/2010 |
| KR | 20070064851 A | 6/2007 |
| WO | 2007081531 A2 | 7/2007 |
| WO | 2009037966 | 3/2009 |
| WO | 2010035676 A1 | 4/2010 |

OTHER PUBLICATIONS

German Patent Application No. 10 2012 210 448.8, Office Action dated Dec. 18, 2014.

Chinese Patent Application No. 201210234449.5 Office Action dated May 29, 2014.

Office Action for U.S. Appl. No. 13/192,559 dated Jun. 13, 2014.

Notice of Allowance for U.S. Appl. No. 13/192,559 dated Oct. 27, 2014.

Office Action for U.S. Appl. No. 13/091,214 dated May 20, 2014.

Final Office Action for U.S. Appl. No. 13/091,214 dated Dec. 17, 2014.

Office Action for U.S. Appl. No. 13/192,559 dated May 7, 2015.

Office Action for U.S. Appl. No. 13/091,214 dated Apr. 17, 2015.

Notice of Allowance for U.S. Appl. No. 13/192,559 dated Sep. 10, 2015.

Notice of Allowance for U.S. Appl. No. 13/293,343 dated Sep. 9, 2015.

Office Action for U.S. Appl. No. 13/091,214 dated Sep. 24, 2015, 28 pages.

Office Action U.S. Appl. No. 13/091,214, dated Dec. 22, 2015.

Office Action for U.S. Appl. No. 14/955,483, dated Mar. 14, 2016.

Notice of Allowance for U.S. Appl. No. 13/091,214, dated Apr. 11, 2016.

* cited by examiner

HOUSEKEEPING CIRCUIT HAVING TRICKLE CHARGE CAPABILITIES

TECHNICAL FIELD

The present invention relates to housekeeping circuit's, such as but not limited to housekeeping circuits included within a vehicle to facilitate regulating voltage output to a plurality of loads, e.g., controllers, processors, or other voltage sensitive loads.

BACKGROUND

As is well known in the automobile industry, electric vehicles (EV) and hybrid-electric vehicles (HEV) may be provided with one or more high voltage batteries for powering the vehicle drivetrain. Such batteries require periodic re-charging after depletion, which may be accomplished by connecting the vehicle to a high voltage AC power line, which may be 120 or 240 volt AC, supplied by an electric utility grid. Such a connection may utilize a suitable vehicle connector configured to interface with a vehicle on-board battery charger (OBC).

Electric and hybrid-electric vehicles may also include a low voltage battery, such as a 12 volt DC battery, for powering low voltage vehicle electrical systems and circuitry. Some or all of such electrical systems and/or circuitry of an EV or HEV could be supplied with energy from a high voltage power source when the vehicle is connected to an AC power line. In that event, such a power source is virtually unlimited and such an arrangement would help preserve the charge and/or extend the life of the vehicle 12 volt DC battery. In the absence of the vehicle connection to the AC power line, certain control circuitry could be supplied with sufficient power from the vehicle 12 volt DC battery to perform various diagnostic functions and/or to permit reprogramming of that control circuitry, such as re-flashing for software updates.

Such an arrangement, however, requires switching between the high voltage power source and the vehicle 12 volt DC battery, depending upon the presence or absence of the vehicle connection to the high voltage AC power line. Such switching may be accomplished using control circuitry and suitable components to sense or detect the presence of the high voltage power. The use of such control circuitry and sensing components, however, adds cost to the EV or HEV and necessarily increases the possibility of circuitry, component and/or system failures.

As a result, there exists a need for multistage power supply system and method for providing uninterrupted low voltage electrical power to control circuitry in an EV or HEV. Such a multistage power supply system and method would be dual source, accepting energy from a high voltage power source and a low voltage vehicle battery. Such a multistage power supply system and method would provide low voltage power for vehicle control circuitry from the high voltage power source when the high voltage power source is present as a result of a connection of an EV or HEV to a high voltage AC power line, and would provide such low voltage power from the low voltage vehicle battery when the high voltage power source is absent. Such a multistage power supply system and method, which could be implemented as part of a vehicle OBC, would do so without control circuitry for switching between the high voltage power source and the low voltage vehicle battery and with a minimal number of components in order to reduce cost and improve reliability.

SUMMARY

One non-limiting aspect of the present invention contemplates a housekeeping circuit for use within a vehicle comprising: a multi-tapped transformer configured to step-down a high voltage input to at least a first low voltage output and a second low voltage output, the first low voltage output being used to power a first load within the vehicle and the second low voltage output being used to power a second load within the vehicle; a first circuit configured for converting a low voltage output of a battery of the vehicle to the high voltage input of the multi-tapped transformer; and a trickle circuit configured to direct a trickle current from the first low voltage output to the battery.

One non-limiting aspect of the present invention contemplates the trickle current is provided by a constant current circuit connected to the first low voltage output.

One non-limiting aspect of the present invention contemplates the constant current circuit provides the trickle current at a fixed amount, thereby setting a minimum load on the first voltage output.

One non-limiting aspect of the present invention contemplates the trickle circuit is configured to provide a first current from the battery to the first load when the multi-tapped transformer is off.

One non-limiting aspect of the present invention contemplates the trickle circuit is configured as a constant load on the first low voltage output, the low constant load being in addition to the first load.

One non-limiting aspect of the present invention contemplates the multi-tapped transformer is cross-regulated.

One non-limiting aspect of the present invention contemplates the multi-tapped transformer regulates both of the first low voltage output and the second low voltage output based on feedback from no more than one of the first load and the second load.

One non-limiting aspect of the present invention contemplates a rectifier configured to convert an AC high voltage input to the high-voltage input of the multi-tapped transformer.

One non-limiting aspect of the present invention contemplates the multi-tapped transformer is configured to step-down the high-voltage input from the first circuit when the high-voltage input from the rectifier is less than a setpoint and to step-down the high-voltage input from the rectifier when the high-voltage input from the rectifier is greater than the setpoint.

One non-limiting aspect of the present invention contemplates the multi-tapped transformer is configured to step-down the high-voltage input to at least a third low voltage output for powering a third load within the vehicle.

One non-limiting aspect of the present invention contemplates the first load is a controller configured for use in low voltage control operations, the second load is a controller configured for use in primary control operations, and the third load is a controller configured for use in high voltage control operations.

One non-limiting aspect of the present invention contemplates a housekeeping circuit for use within a vehicle to provide a regulated voltage to a plurality of voltage sensitive controllers, the housekeeping circuit comprising: a transformer configured to regulate a single voltage input into a plurality of voltage outputs, each one of the plurality of voltage outputs providing regulated voltage to a corresponding one or more of the plurality of voltage sensitive controllers; and a trickle circuit powered by a first one of the plurality of voltage outputs, the trickle circuit being configured to provide a trickle current to a battery within the vehicle, the trickle circuit setting a first load on the one of the plurality of voltage outputs, the first load being in addition to loading associated with the corresponding one or more one of the plurality of voltage sensitive controllers, thereby establishing a minimum load on the one of the plurality of voltage outputs to be at least equal to the first load.

One non-limiting aspect of the present invention contemplates the transformer is multi-tapped and each of the plurality of voltage outputs is connected to a separate transformer tap.

One non-limiting aspect of the present invention contemplates the transformer is cross-regulated to one of the plurality of voltage outputs.

One non-limiting aspect of the present invention contemplates the transformer is cross-regulated to no more than the one of the plurality of voltage outputs.

One non-limiting aspect of the present invention contemplates the transformer is configured to receive the single voltage input from a rectifying circuit when an AC power supply is connected and to receive the single voltage input from a first circuit when the AC power supply is disconnected, wherein the rectifying circuit is configured to rectify an AC input of the AC power supply to the single voltage input of the transformer and wherein the first circuit is configured to step-up a low voltage output of the battery to the single voltage input of the transformer.

One non-limiting aspect of the present invention contemplates a method for use within a vehicle to provide a regulated voltage to a plurality of loads, the method comprising: cross-regulating a transformer configured to regulate a single voltage input into a plurality of voltage outputs, each one of the plurality of voltage outputs providing regulated voltage to a corresponding one or more of the plurality of loads, the cross-regulated transformer being regulated based on loading of the plurality of voltage outputs; and wherein a trickle circuit provides a trickle current to a battery within the vehicle, the trickle circuit setting a first load on a first one of the plurality of voltage outputs, thereby establishing a minimum load on the one of the plurality of voltage outputs to be at least equal to the first load.

One non-limiting aspect of the present invention contemplates an amount of the trickle current is fixed regardless of additional loading on the first one of the plurality of voltage outputs.

One non-limiting aspect of the present invention contemplates the trickle circuit is configured to provide current from the battery to the corresponding one or more of the plurality of loads connected to the first one of the plurality of voltage outputs when the transformer is inactive.

One non-limiting aspect of the present invention contemplates the cross-regulated transformer is configured to receive the single voltage input from a rectifying circuit when an AC power supply is connected and to receive the single voltage input from a first circuit when the AC power supply is disconnected, wherein the rectifying circuit is configured to rectify an AC input of the AC power supply to the single voltage input of the cross-regulated transformer and wherein the first circuit is configured to step-up a low voltage output of the battery to the single voltage input of the cross-regulated transformer.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
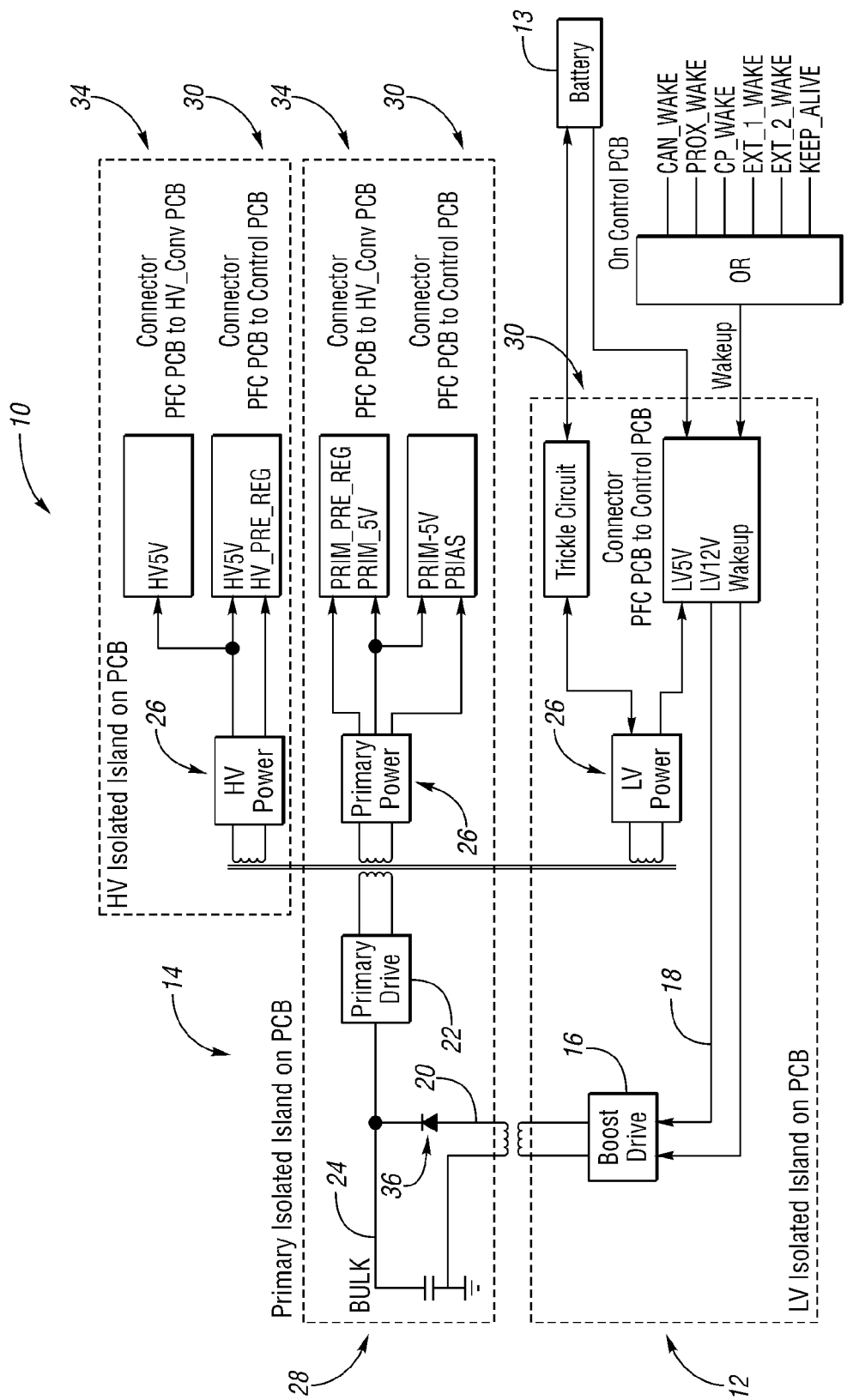
FIG. 1 illustrates a multistage power supply system in accordance with one non-limiting aspect of the present invention.

FIG. 1 illustrates a multistage power supply system 10 in accordance with one non-limiting aspect of the present invention. The multistage power supply system 10 may be configured to provide uninterrupted low voltage electrical power to control circuitry in the vehicle, such as in the manner described in U.S. patent application Ser. No. 13/192,559, the disclosure of which is hereby incorporated by reference in its entirety. The system 10 may be characterized as a housekeeping circuit in that it may be configured to provide voltage regulation for a plurality of loads throughout a plurality of operating conditions. This type of housekeeping functionality may be particularly beneficial with electric and/or hybrid electric vehicles, as well as with other vehicles or other devices requiring similar regulation, in that it can be used to provide voltage regulation depending on whether a plug-in charging operation is taking place, i.e., whether an AC voltage source is available in place of an on-board power system.

The multistage power supply system 10 may comprise a first stage 12 and a second stage 14. The first and second stages 12, 14 of the multistage power supply 10 may be provided in series communication with each other. The first stage 12 of the multistage power supply system 10 comprises a converter 16 for receiving a low voltage input 18 from a vehicle battery 13, which may be a 12 volt DC input. The first stage converter 16 is also for converting the vehicle battery low voltage input 18 to a high voltage output 20, which may be a 100 volt DC output. In that regard, the first stage converter 16 may comprise a boost converter for boosting a low voltage 12 volt DC input from the vehicle batter to a high voltage 100 volt DC output.

The second stage 14 of the multistage power supply system 10 comprises a converter 22 for receiving either a rectified AC high voltage input 24 or the high voltage output 20 from the first stage 12 of the multistage power supply system 10. The second stage converter 22, which may be an isolated flyback converter, is also for converting the rectified AC high voltage input 24 or the first stage high voltage output 20 to a low voltage output 26, which may be a 5 volt DC output, for use in powering the vehicle control circuitry (not shown). More specifically, the low voltage output 26 may be produced by the second stage 14 from the rectified AC high voltage input 24 when the rectified AC high voltage input 24 is present at the input of the second stage converter 22. Alternatively, when the rectified AC high voltage input 24 is absent from the input of the second stage converter 22, the low voltage output 26 may be produced by the second stage 14 from the first stage high voltage output 20.

The rectified AC high voltage input 24 may be produced as an output by a bulk power source 28 and has a minimum value associated therewith. The bulk power source 28 may comprise a rectifier and may produce the rectified AC high voltage input 24 by rectifying an AC high voltage input received from an AC power line (not shown), such as with connection of an electric vehicle supply equipment (EVSE) disclosed in U.S. Pat. No. 7,878,866, the disclosure of which is hereby incorporate by reference in its entirety. The first stage converter 16 may be provided in communication with the output of the bulk power source 28 (i.e., the rectified AC high voltage input 24), such as via diode 36, and may be designed with a setpoint less than the minimum value of the rectified AC high voltage input 24. As a result, in the absence of the rectified AC high voltage input 24 at the input of the second stage converter 22, the first stage converter 16 may produce the first stage high voltage output 20 which may be supplied to the input of second stage converter 22.

As is readily apparent, then, when the rectified AC high voltage input 24 is produced by the bulk power source 28 as a result of a connection of the EV or HEV to a high voltage AC power line, the vehicle control circuitry may be provided with electrical power via the multistage power supply system 10 from the bulk power source 28. Alternatively, in the absence a connection of the vehicle to a high voltage AC power line, the vehicle control circuitry may still be provided with electrical power via the multistage power supply system 10 from the vehicle battery. Thus, the multistage power supply system 10 may provide uninterrupted low voltage electrical power to the vehicle control circuitry, without regard to whether the vehicle is connected to a high voltage AC power line. In such a fashion, even in the absence of a vehicle connection to a high voltage AC power line, sufficient power may still be provided to the vehicle control circuitry via the multistage power supply system 10 for the control circuitry to perform various diagnostic operations or to permit reprogramming or re-flashing of the control circuitry.

It should be noted that the low voltage output 26 for use in powering the vehicle control circuitry may comprise multiple isolated low voltage outputs for use in powering multiple controllers that are part of the vehicle control circuitry (not shown). For example, one low voltage output 26 may be provided for powering a controller (not shown) for use in primary control operations via a connector 30. Similarly, another low voltage outputs 26 may be provided for powering a controller (not shown) for use in low voltage control operations via another connector 32. Still another low voltage output 26 may be provided for powering a controller (not shown) for use in high voltage control operations via still another connector 34. Optionally, the LV power supply may be used to power low voltage logical elements associated with various vehicle operations, including those which require operation when the transformer is inactive or off, such as to facilitate wake-up operations associated with monitoring for connection of the EVSE as described in U.S. patent application Ser. Nos. 13/293,343 and 13/293,345, the disclosures of which are hereby incorporated by reference in their entirety.

Figure 2:
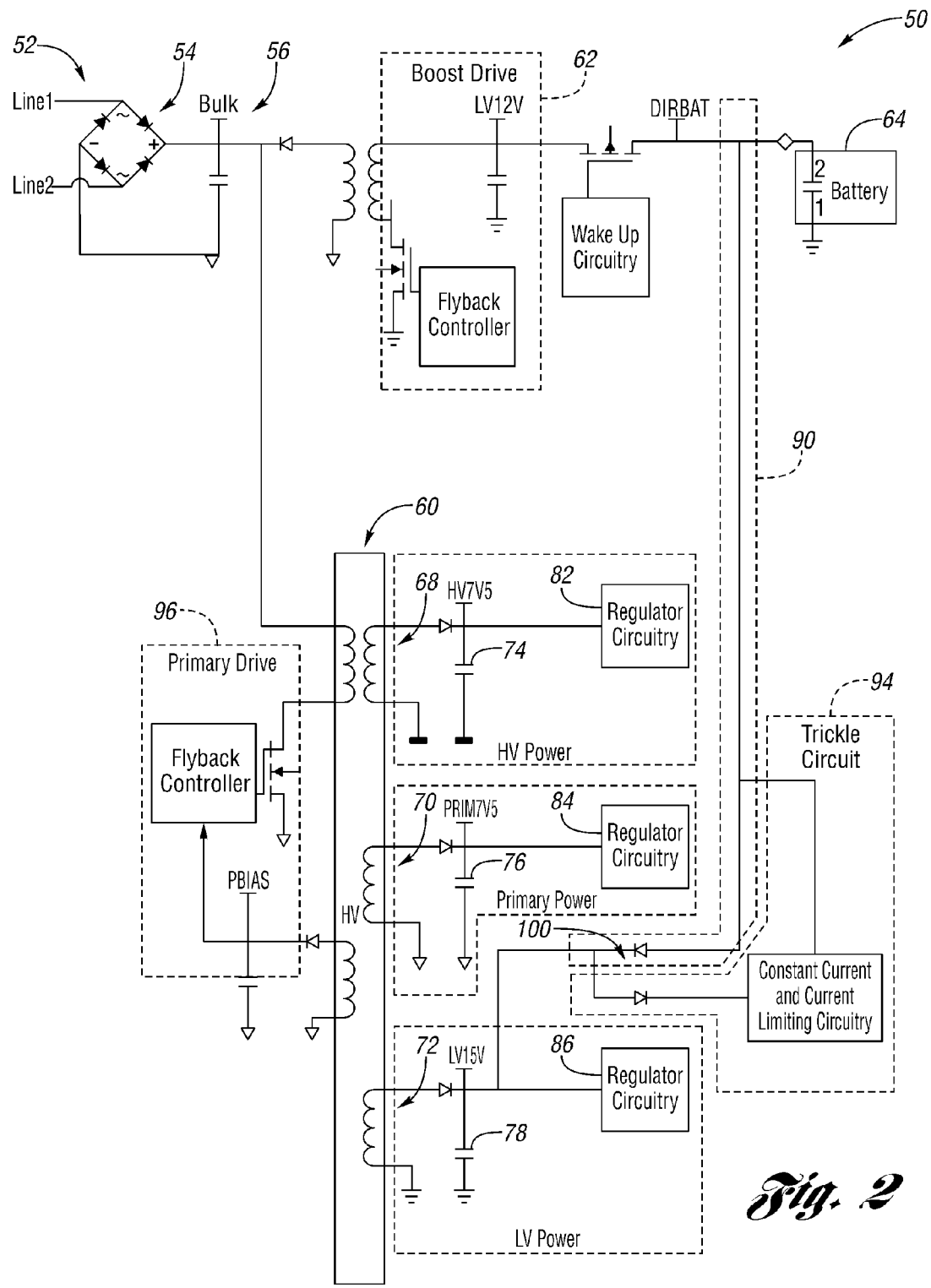
FIG. 2 illustrates a housekeeping circuit as contemplated by one non-limiting aspect of the present invention.

FIG. 2 illustrates a housekeeping circuit 50 as contemplated by one non-limiting aspect of the present invention. The housekeeping circuit 50 may be configured to provide the multistage power described above with respect to FIG. 1. The features of the housekeeping circuit 50 corresponding with the operations described above in FIG. 1 are correspondingly labeled in FIG. 2 and are contemplated to provide the same or similar functionality is that described above with respect to FIG. 1. The present invention, however, is not necessarily limited to the description provided above with respect to FIG. 1 and/or its use within a vehicle having capabilities to receive AC power through an EVSE. The present invention fully contemplates its use and application to any environment where may be desirable to facilitate current regulation in a manner contemplated by the present invention.

The housekeeping circuit 50 may be configured to receive an AC input through a first-line a second line connection 52 made to a rectifier 54. The rectifier 54 may output to a bulk power source 56 or other entity sufficient to provide the corresponding high voltage to an input of a multi-tapped transformer 60. Depending on whether a sufficient AC input is provided, a similar high-voltage input may be provided to the multi-tapped transformer from a boost drive 62 associated with a low voltage vehicle battery 64. The multi-tapped transformer 60 may be configured to step-down the high-voltage input to a plurality of low voltage outputs 68, 70, 72. The low voltage outputs 68, 70, 72 are shown for exemplary non-limiting purchases to be associated with those described in FIG. 1, i.e., the HV power, the primary power, in the LV power. The loads 74, 76, 78 associated therewith are shown to be generically represented and may respectively correspond with controllers or other sensitive devices used to facilitate related control of the corresponding vehicle systems. Optionally, each of the low voltage outputs 68, 70, 72 may include regulatory circuitry 82, 84, 86 to further facilitate regulating the voltage output from the transformer.

A current path 90 may be provided from the vehicle battery 64 to the low-voltage power output 72 when the transformer 60 is off or otherwise inactive, e.g., when the EVSE is disconnected or not providing a sufficient amount of power. This current path 90 may be beneficial in ensuring continued powering of the LV power connected devices, e.g., logic and other drive elements associated with facilitating wake-up detection for an onboard charger system (OBC) or other desiring vehicle systems that we may require continuous powering. The HV power connected loads and the primary power connected loads, however, may be loads dependent on connection of the EVSE or other operations associated with the transformer receiving AC rectified input, i.e., those which are only operational when a plug-in charging operation is taking place or other charging operation of a high-voltage battery or other energy source (not shown) is being conducted or being prepared for execution and/or when it may be desirable to provide power through the transformer 60 instead of through the current path 90.

When the transformer 60 is active, one non-limiting aspect of the present invention contemplates the use of a trickle circuit 94. The trickle circuit 94 may be configured as a constant current and/or current limiting circuitry operable to provide a constant supply of current to the battery 64. The trickle circuit 94 may be configured to provide any desirable amount of current and/or it may be configured to monitor various operating conditions and to adjust the amount of provided current. For exemplary purposes, however, the present invention is predominately described with respect to the trickle circuit 94 being configured to provide a fixed amount of current, e.g., 100 mA, to the battery 64 whenever the transformer 60 is active, e.g., providing voltage output to the HV power, the primary power, in the LV power outputs

68, 70, 72. The present invention contemplates use of this fixed current draw in order to maintain a constant, minimum loading on the transformer 60, which may be beneficial in facilitating transformer related controls.

More specifically, the transformer 60 may be a multi-tapped transformer where a primary drive 96 used to control its operation is based on a cross-regulated process where control of a flyback controller or other device associated with managing the step-down operation of the transformer 60 is based on presence of loads at each of the separately tapped output portions 68, 70, 72. One non-limiting aspect of the present invention contemplates controlling operation of the transformer 60 based on no more than one of the output loads. Because of this feedback-type of control, the housekeeping circuit 50 may require a minimum amount of loading at one or more of the HV power, primary power, and LV power voltage outputs 68, 70, 72 in order to ensure proper operations. The loading induced by the trickle circuit 94 may be designed to correspond with a minimum loading requirement of the transformer 60 so as to ensure a sufficient amount of loading is always provided in order to ensure desired control of the transformer.

With a minimum loading guaranteed by the trickle circuit 94, any additional loading created by operation of any one or more of the loads associated with the HV power, the primary power, and LV power outputs 68, 70, 72 consequently increases the loading on the transformer 60. This increase loading, however, it may be desirable as long as it does not exceed the maximum capabilities of the transformer 60, i.e., the transformer 60 may be selected to ensure sufficient maximum capabilities to meet these demands. While some cases it may be desirable to limit the loading on the transformer 60, during which the trickle circuit 94 may be turned off or otherwise eliminated, the present invention believes it would be more desirable to enhance the loading in order to ensure a sufficient amount of loading is provided to facilitate proper control. Moreover, the use of the trickle circuit 94 may be beneficial over tying a resistor to ground, which may also be done without deviating from scope and contemplation of the present invention, since the energy created from the trickle circuit 94 may be used to facilitate charging of the low voltage battery.

Optionally, the voltage output regulated to each of the HV power, the primary power, and LV power outputs 68, 70, 72 may correspond with the same voltage level and/or different voltage levels specific to each output. The current path 90 from the battery 64 to the LV power output 72 may automatically cease once the LV power output 72 begins receiving energy from the transformer 60. This may occur with the transformer 60 being at a voltage greater than the low voltage battery 64, e.g., the LV power output 72 may be 15 V DC while the low voltage battery may be a 12 V DC. The increased voltage of the LV output 72 from the transformer 60 would automatically prevent the battery 64 from discharging through the current path to the LV power connected loads. This allows the present invention to switch powering of the LV power connected devices between the LV power output of the transformer 60 and the current path 94 without having to rely on switches or software related controls. Instead, the LV power output 72 of the transformer and a pair of opposed diodes 100 may be included to achieve the desired flow of current.

Figure 3:
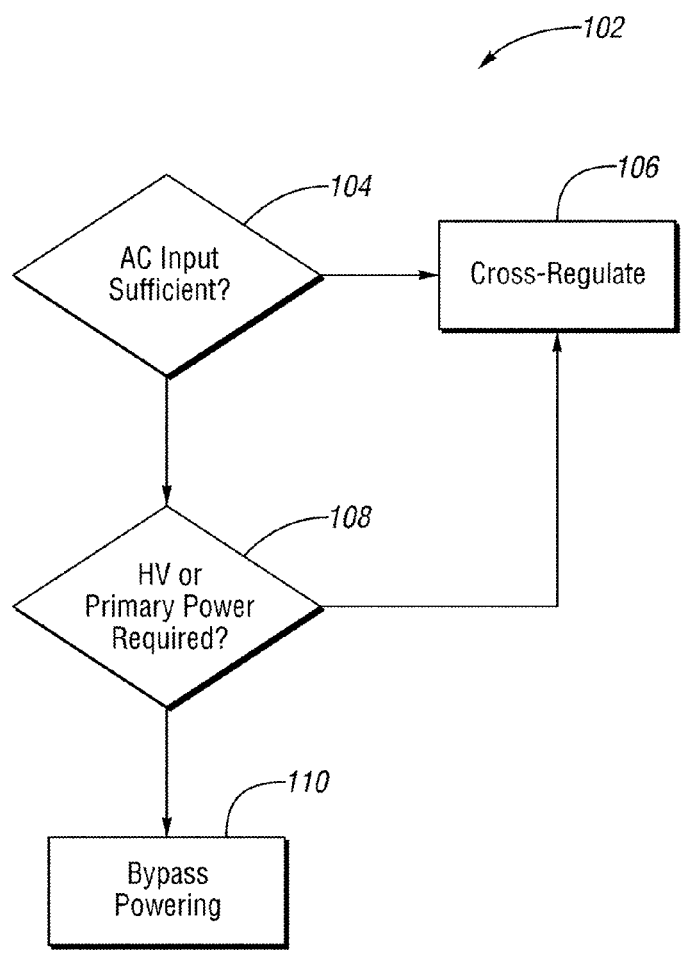
FIG. 3 illustrates a flowchart of method of facilitating housekeeper-type control as contemplated by one non-limiting aspect of the present invention

FIG. 3 illustrates a flowchart 102 of method of facilitating housekeeper-type control in accordance with one non-limiting aspect of the present invention. The method may be embodied in a computer-readable medium and executed with a processor associated therewith, such as with a computer-readable medium and/or processor associated with one of the elements described above with respect to FIGS. 1 and 2 and/or otherwise associated with the vehicle. The method generally relates to facilitating control of a housekeeping circuit depending on whether energy is available from the AC input and whether a HV power and a primary power connected devices are requiring powering.

Block 104 relates to assessing whether the AC input is sufficient to facilitate powering of the HV power, the primary power, and the LV power connected loads. In the event the AC input is sufficient, Block 106 relates to cross-regulating a transformer to achieve the desired voltage outputs to the respective HV power, the primary power, and LV power connected loads. The cross-regulating may be achieved by regulating operation of the transformer and/or primary drive according to loading at one or more of the voltage outputs of the transformer, e.g., the voltage outputs associate with AC power, the primary power, and LV power. In the event the cross-regulating requires the transformer to be controlled according to no more than one of the loads, the desired loading can be achieved by use of the trickle circuit described above providing a minimum loading requirement for the transformer to enable this type of load-based control.

Block 108 relates to assessing whether the HV or primary power connected loads are requiring power. This may occur during conditions during which the EVSE is connected such that it may be assumed that the LV power also requires powering. In the event that HV or primary power connected loads require powering, Block 106 may be returned to facilitate related cross-regulating of the transformer. Because Block 108 would be reached in the event the AC input is insufficient, the corresponding cross regulating in Block 106 may be based on current provided from the low-voltage battery. In the event that HV or primary power connector loads do not require powering, Block 110 relates to bypass powering through the current path shown in FIG. 2. This may be done in order to assure sufficient flow of current to one or more of the LV power connected devices.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A housekeeping circuit for use within a vehicle comprising:
    a multi-tapped transformer configured to step-down a high voltage input to at least a first low voltage output and a second low voltage output, the first low voltage output being used to power a first load within the vehicle and the second low voltage output being used to power a second load within the vehicle; and
    a trickle circuit configured to provide a trickle current to a battery of the vehicle when the multi-tapped transformer is active, wherein the trickle circuit is further configured to provide a first current from the battery to the first load when the multi-tapped transformer is inactive, and wherein the trickle current is a fixed current establishing a minimum load on the first voltage output.

2. The housekeeping circuit of claim 1 wherein the trickle current is provided by a constant current circuit connected to the first low voltage output.

3. The housekeeping circuit of claim 1 wherein the trickle circuit is configured as a constant load on the first low voltage output, the constant load being in addition to the first load.

4. The housekeeping circuit of claim 1 wherein the multi-tapped transformer is cross-regulated.

5. The housekeeping circuit of claim 1 further comprising a rectifier configured to convert an AC high voltage input to the high-voltage input of the multi-tapped transformer.

6. The housekeeping circuit of claim 5 further comprising a first circuit configured to convert a low voltage output of the battery to the high voltage input of the multi-tapped transformer, wherein the multi-tapped transformer is configured to step-down the high-voltage input from the first circuit when the high-voltage input from the rectifier is less than a setpoint and to step-down the high-voltage input from the rectifier when the high-voltage input from the rectifier is greater than the setpoint.

7. The housekeeping circuit of claim 1 wherein the multi-tapped transformer is configured to step-down the high-voltage input to at least a third low voltage output for powering a third load within the vehicle.

8. The housekeeping circuit of claim 7 wherein the first load is a controller configured for use in low voltage control operations, the second load is a controller configured for use in primary control operations, and the third load is a controller configured for use in high voltage control operations.

9. A housekeeping circuit for use within a vehicle to provide a regulated voltage to a plurality of controllers, the housekeeping circuit comprising:
  a transformer configured to regulate a single voltage input into a plurality of voltage outputs, each one of the plurality of voltage outputs providing regulated voltage to a corresponding one or more of the plurality of controllers; and
  a trickle circuit powered by a first one of the plurality of voltage outputs, the trickle circuit configured to provide a trickle current to a battery within the vehicle when the transformer is active, the trickle circuit thereby establishing a first load on the one of the plurality of voltage outputs, the first load being in addition to loading associated with the corresponding one or more one of the plurality of controllers, the first load being a minimum load on the one of the plurality of voltage outputs;
  wherein an amount of the trickle current is fixed regardless of additional loading on the one of the plurality of voltage outputs.

10. The housekeeping circuit of claim 9 wherein the transformer is multi-tapped and each of the plurality of voltage outputs is connected to a separate transformer tap.

11. The housekeeping circuit of claim 10 wherein the transformer is cross-regulated to at least one of the plurality of voltage outputs.

12. The housekeeping circuit of claim 11 wherein the transformer is cross-regulated to only one of the plurality of voltage outputs.

13. The housekeeping circuit of claim 9 wherein the transformer is configured to receive the single voltage input from a rectifying circuit when an AC power supply is connected and to receive the single voltage input from a first circuit when the AC power supply is disconnected, wherein the rectifying circuit is configured to rectify an AC input of the AC power supply to the single voltage input of the transformer and wherein the first circuit is configured to step-up a low voltage output of the battery to the single voltage input of the transformer.

14. A method for use within a vehicle to provide a regulated voltage to a plurality of loads, the method comprising:
  cross-regulating a transformer configured to regulate a single voltage input into a plurality of voltage outputs, each one of the plurality of voltage outputs providing regulated voltage to a corresponding one or more of the plurality of loads, the cross-regulated transformer being regulated based on loading of the plurality of voltage outputs; and
  wherein a trickle circuit provides a trickle current to a battery within the vehicle when the transformer is active, the trickle circuit thereby establishing a first load on a first one of the plurality of voltage outputs, the first load being a minimum load on the first one of the plurality of voltage outputs, and wherein an amount of the trickle current is fixed regardless of additional loading on the first one of the plurality of voltage outputs.

15. The method of claim 14 wherein the trickle circuit is configured to provide current from the battery to the corresponding one or more of the plurality of loads connected to the first one of the plurality of voltage outputs when the transformer is inactive.

16. The method of claim 14 wherein the cross-regulated transformer is configured to receive the single voltage input from a rectifying circuit when an AC power supply is connected and to receive the single voltage input from a first circuit when the AC power supply is disconnected, wherein the rectifying circuit is configured to rectify an AC input of the AC power supply to the single voltage input of the cross-regulated transformer and wherein the first circuit is configured to step-up a low voltage output of the battery to the single voltage input of the cross-regulated transformer.

* * * * *